(12) United States Patent
Blortz et al.

(10) Patent No.: US 6,669,972 B2
(45) Date of Patent: Dec. 30, 2003

(54) PROCESS FOR THE PRODUCTION OF A MUSHROOM FLAVORING

(75) Inventors: Doris Blortz, Ilsfeld (DE); Rudi Müller, Leingarten (DE)

(73) Assignee: Bestfoods, Englewood Cliffe, NJ (US)

( * ) Notice: Subject to any disclaimer, the term of this patent is extended or adjusted under 35 U.S.C. 154(b) by 0 days.

(21) Appl. No.: 09/950,973

(22) Filed: Sep. 13, 2001

(65) Prior Publication Data

US 2002/0071900 A1 Jun. 13, 2002

(30) Foreign Application Priority Data

Sep. 14, 2000 (DE) .......................................... 100 45 423

(51) Int. Cl.⁷ ................................................ A23L 1/22
(52) U.S. Cl. .......................... 426/52; 426/49; 426/533; 426/650
(58) Field of Search ............................ 426/52, 533, 49, 426/51, 534, 535, 650

(56) References Cited

U.S. PATENT DOCUMENTS 4,032,663 A * 6/1977 Kobayashi et al. ............ 426/51
4,324,806 A * 4/1982 Schmitz ........................ 426/52

FOREIGN PATENT DOCUMENTS

| DE | 35 24 473 | 1/1987 |
| EP | 0 288 773 B1 | 1/1992 |
| EP | 0 600 684 B1 | 6/1997 |
| FR | 2 357 191 | 3/1978 |

OTHER PUBLICATIONS

"New Product Possibilities With . . . Natural Extracts"; *Food Engineering*; Nov. 1988; 60 (11); pp. 53, 56.

"Flavor Recovery From Mushroom Blanching Water"; Wu et al.; *The Quality of Foods and Beverages*; vol. I; 1981; pp. 133–145.

* cited by examiner

Primary Examiner—Leslie Wong

(57) ABSTRACT

The present invention relates to a process for the production of a natural mushroom extract by addition of an enzyme composition to a mushroom preparation.

21 Claims, 3 Drawing Sheets

Batch 1: Boletus edulis, starting material
Batch 2: Boletus edulis extract, without enzyme
Batch 3: Boletus edulis extract, without Flavourzyme™ & SP 299

Batch 1: Boletus edulis, starting material
Batch 2: Boletus edulis extract, without enzyme
Batch 3: Boletus edulis extract, without Flavourzyme™ & SP 299

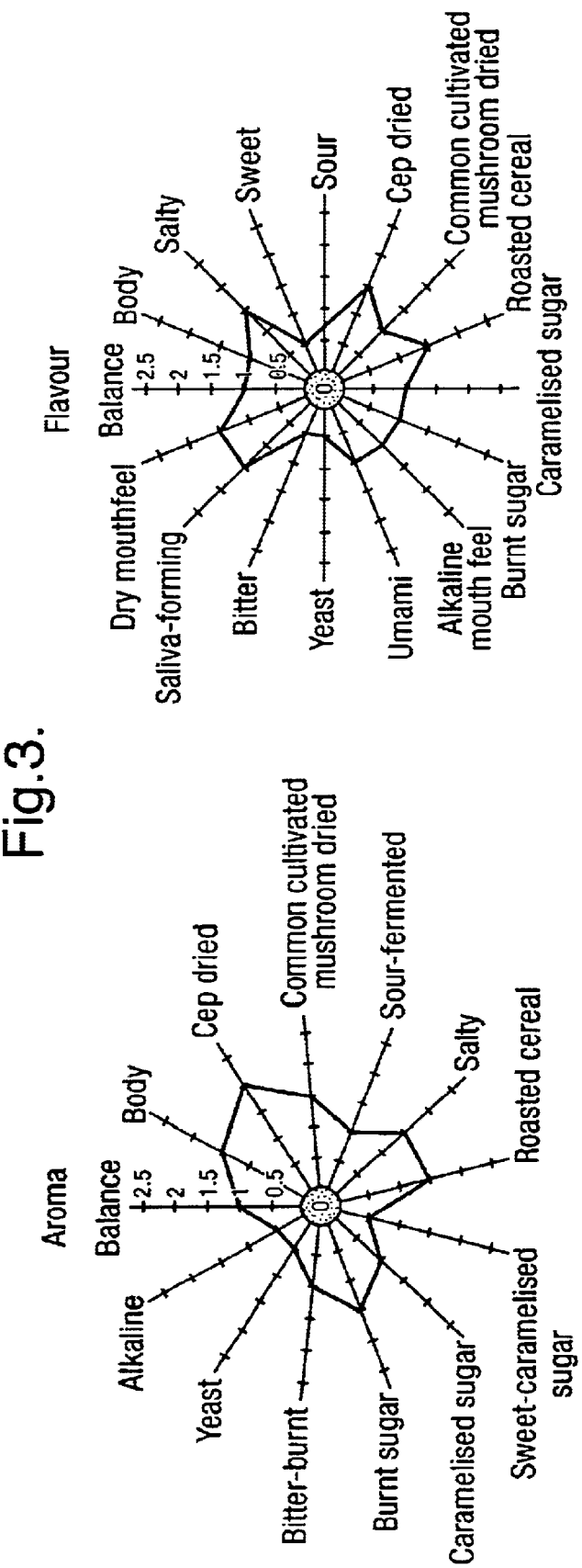

PROCESS FOR THE PRODUCTION OF A MUSHROOM FLAVORING

The present invention relates to a process for the production of a mushroom flavouring by addition of a cell-wall-macerating enzyme composition to a mushroom preparation.

Edible fungi are important flavouring additives in many dishes and are raw materials which are widely used particularly in nutritionally conscious cuisine. They are distinguished by a low content of digestible carbohydrates and fat, and in contrast have a considerable protein content and a significant amount of unusual glucan dietary fibres. In recent decades it has become possible to culture the edible fungi most frequently used (common cultivated mushrooms, oyster mushrooms, shiitake, *Boletus lutens* and China mushrooms). One of the mushrooms which are being much used because of their unique taste/aroma is the dried cep (*Boletus edulis*). The cep is a symbiotic fungus and still cannot be successfully cultured. It is available as a gathered natural raw material only in fluctuating amounts and quality. The fresh *Boletus edulis* occurs as mycorrhiza in association with certain types of tree only in forests and is air-dried after harvesting, as a result of which it only then develops its typical spicy flavour. Dried cep contains approximately 20% protein, 3 to 4% fat and only 4% digestible carbohydrates, the rest is indigestible dietary fibre and about 6% minerals. In addition, a significant amount of purines is present.

In addition to truffles and chanterelles, the cep is the most expensive edible fungus which cannot be cultured and for which there is simultaneously a high demand. For industrial use, for example in mushroom dishes, processed products (slices, granules and powder) are used which are freed from foreign matter and sand. One difficulty in the processing of cep is that the material is supplied with a variable water content and is contaminated, inter alia, by sand particles. This is the reason why in industrial processing a residue is always produced which cannot be utilized further. This residue, however, still contains the complete flavour potential which could be utilized after digestion of the fungal cells to produce flavour substances. The flavour substances which can be detected in fungi, particularly *Boletus edulis*, are highly basic amino acids, pyrazines, alcohols, phenols and amines, and, as volatile compounds, lactones and sulphur compounds and 1-octen-3-ol which is typical of fresh mushrooms and 1-octen-3-one which is typical of cooked mushrooms.

Fungal cell walls principally consist of a framework substance (chitin) embedded in a protein and carbohydrate matrix. Chitin is a poorly degradable, nitrogen-containing cellulose derivative (N-acetyl-D-glucosamine homopolymer, 2-acetamidocellulose). In common cultivated mushrooms, chitin microfibres are embedded in a $\beta$-1,3-glucan matrix.

A number of processes are known in the prior art for producing extracts or flavour compounds from edible fungi.

It is known to produce a natural common cultivated mushroom flavour by concentrating mushroom cooking water (Wu et al., 1981, in: The Quality of Food and Beverages: Chemistry and Technology, Vol. I, pages 133 to 145). This route is not possible for producing flavour from dried mushrooms.

DE 35 24 473 discloses the production of a natural mushroom juice by removing juice from mushroom fruiting bodies, flavour enrichment being achieved by evaporation under vacuum.

FR 2 357 191 discloses a process for production of mushroom extract by aqueous maceration and subsequent pressing of the extract and sterilization.

EP 288 773 describes, as a method for enriching a mushroom flavouring, preferably from homogenized mushrooms, a fermentation with the flavour precursor linolenic acid.

EP 600 684 B1 discloses a method for producing flavoured yeast extracts using hydrolysates of fruit, vegetable, herbs, spices and/or fungi. These hydrolysates may be formed enzymatically. Suitable enzymes for the enzymatic hydrolysis include carbohydrases, in particular cellulases, hemi-cellulases, pectinases and endogalacturonases.

Food Engineering, 1988, 60 (11) 53, 56 describes for shiitake, the production of a flavour after aqueous and alcoholic extraction.

A number of cep powders which have been used for flavouring also have, in addition to the sand content, the disadvantage of a restricted storage life due to enzyme activities which are still present, for example lipases. The conventional processes for the production of mushroom flavour frequently have the disadvantage that either many aroma compounds and flavour substances are destroyed due to harsh conditions, or that under milder conditions the yield, based on the fungal material used, is low, since the desired substances can only be isolated inadequately from the fungal cells.

An object of the present invention is to provide a process for the production of a mushroom flavouring which firstly has a good yield and secondly produces a natural mushroom flavour which includes the important hydrophilic flavour potential (aroma, proteins, taste-active nucleotides).

Surprisingly, it has been found that a typical hydrophilic mushroom flavour can be produced from mushrooms by a specific enzymatic digestion. According to the process of the invention, an edible fungus preparation is firstly prepared. A cell-wall-macerating enzyme composition exhibiting chitinase activity and/or mutanase activity is then allowed to act on this edible fungus preparation. Finally, if appropriate, solid constituents are separated off.

BRIEF DESCRIPTION OF THE DRAWINGS

FIG. 3 shows a spider web of all perceptible taste and aroma attributes and their intensity.

Figure 1:
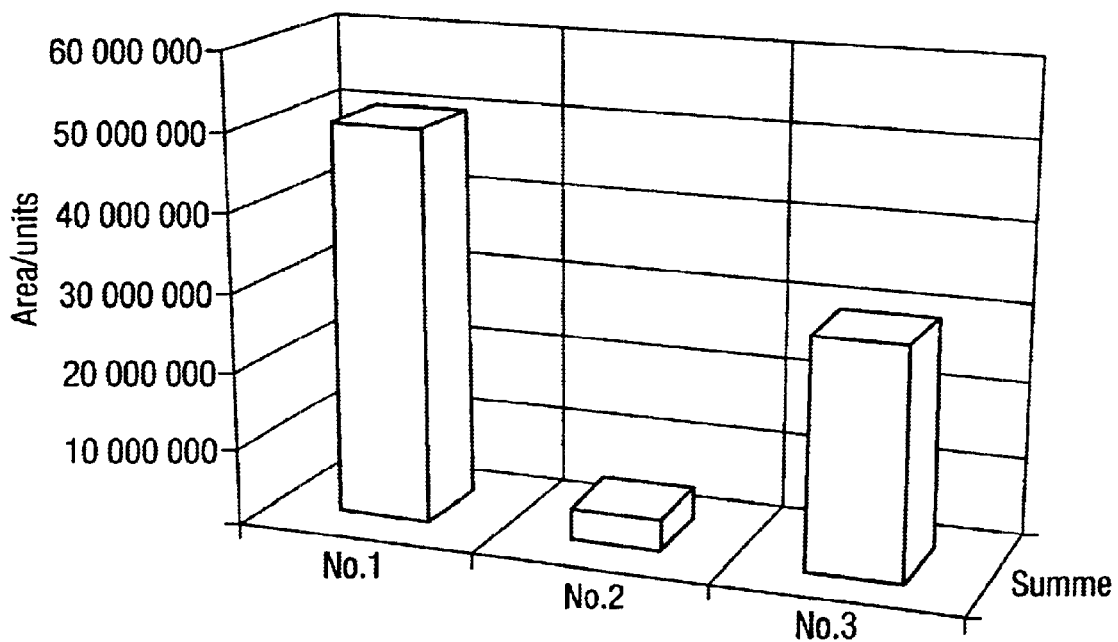
FIG. 1 shows the total peak area of all aroma and flavor compounds typical of mushroom.

For the edible fungus preparation, according to the invention all edible fungi, preferably wild mushrooms, can be used. However, preference is given to edible fungi which cannot be cultivated, such as cep or chanterelle. Preferably, the mushrooms are prepared in dried form. They can be used here in disc or diced form, as granules or powder. The edible fungus preparation can also be in aqueous form. The mushrooms can be slurried in water or be present as a mash. Most preferably, *Boletus edulis* (cep) is used in granule or disc form or as powder. In addition, especially because of the less expensive raw material, the residue which is produced in cep processing and is distinguished by an increased sand content can be used. In addition, a fatty particulate Boletus raw material can be used, from which the "lipophilic" part of the flavour substances has already been removed by previous extraction in liquid fat. In the described method a 1:1 to 1:6 mixture of the described mushroom residues in water may be used. In one embodiment of the inventive process, the edible fungus preparation used is a raw material without further pretreatment such as mechanical digestion, mechanical comminution, defatting or pH correction, and after the action of the cell-wall-macerating enzyme composition, the remaining solid constituents are separated off.

The edible fungus preparation provided can be admixed with water prior to the addition of the enzyme composition and if appropriate heated. In this case, customarily, it is heated to a temperature between 60 and 120° C., preferably between 90 and 110° C. The raw material can be heated to boiling temperature with a several-fold excess of water, for example without further cleaning or defatting, to facilitate the digestion of the cells and to avoid microbial infections, in a cooking pot or, in the case of larger batches, in a stainless steel vessel (pressure vessel with jacket and stirrer). In this case the material swells considerably and absorbs at least 100% water. The highly viscous mash is then cooled with stirring or shaking and the fungal cells are digested at 30 to 60° C., preferably 45 to 55° C., by addition of a cell-wall-macerating enzyme composition.

"Cell-wall-macerating enzyme compositions" for the purposes of this application are enzyme compositions which are able to degrade the cell wall of fungi to the extent that at least some of the cellular constituents can escape from the cells. The enzyme composition can be a solution, solid or dispersion. It can exhibit a plurality of enzymatic activities. According to the invention the enzyme composition exhibits chitinase and/or mutanase activity. Preferably, the enzyme composition exhibits both, chitinase and glucanase activity. Mutan is an insoluble glucan which occurs in fungal cell walls. Advantageous results are achieved, for example, using the enzyme preparation SP 299, obtainable from the company Novo Nordisk. SP 299 comprises an enzyme complex produced by fermentation of the fungus *Trichoderma harzianum*. The principal activity of the enzyme preparation attacks 1,3-α bonds of the insoluble glucan (mutan). In addition, SP 299 exhibits cellulase, laminarinase, xylanase, chitinase and proteinase activities. It is not necessary to set the pH. SP 299 is active in the neutral and slightly acidic pH range. The preferred concentration of SP 299 is 0.1 to 3% (w/w), based on the dry weight of fungus used. Most preferably, 0.5 to 1.5% is used. Instead of SP 299, "Novoferm 96" from Novo Nordisk can also be used, preferably in a concentration of 0.2 to 0.7%.

To increase the yield, particular preference is given to the additional addition of a proteinase having endo/exopeptidase activity. The proteinase can be added to the edible fungus preparation simultaneously with the cell-wall-macerating enzyme composition. However, addition before or afterwards is also possible. All peptidases can be used which have sufficient enzyme activity in a neutral and slightly acidic environment. Good results are achieved with the enzyme preparation Flavourzyme™ from Novo Nordisk. Flavourzyme™ is a protease/peptidase complex for the extensive hydrolysis of proteins. Flavourzyme™ is produced by fermentation of a selected strain of *Aspergillus oryzae* and exhibits endoprotease and exopeptidase activities. The preferred pH range for the enzyme complex is 5.0 to 7.0. The preferred temperature range is 30 to 60° C., the most preferred is 45 to 55° C. The preferred concentration of Flavourzyme™ is 0.1 to 3% (w/w), based on the dry weight of fungus used. Most preferably, 0.5 to 1.5% is used.

After a few hours, the batch is markedly liquefied. Generally, the enzyme treatment is carried out for 0.5 to 48 hours, preferably for 5 to 24 hours. Although it is known that the protein fraction and thus also a considerable part of the flavour substance components in basidiomycetes are firmly bound in chitin, it is possible to make a large part of the protein accessible. The digestion in the inventive process leads deliberately not to the complete disintegration of the fungal cell wall, it is only carried out to the point that the substances of value and flavour compounds can be extracted from the cell as unchanged and completely as possible. This beneficial effect may be clearly demonstrated if the extract yields and nitrogen yields and also the flavour potential found by analysis and sensory analysis of the extract produced are compared with that which would be obtained with only aqueous extraction without addition of enzyme (see Examples 1 to 4).

Finally, a clear extract of the mushroom flavouring can be obtained by conventional processes of solid/liquid separation, for example by centrifugation, using a decanter, a press or by membrane filtration. The inventive mushroom flavouring is then present as solution or suspension. However, it can also be present as dispersion or as composition containing solids, for example if the solid constituents are not separated off. Preferably, the mushroom flavouring is pasteurized for enzyme inactivation. Finally, to increase the yield, it can be expedient to perform an aqueous extraction of the residue.

The inventive process has the advantage that as a result of the enzyme-supported "extraction" from the fungal material, in comparison to a purely aqueous extraction, a weight yield about 20 to 25% higher is obtained (see Example 2). In addition, protein is released from the fungal cells in such a manner that about 50% is present at the end of the process dissolved in mushroom flavouring as free amino acids. This also substantially avoids the protein constituents only being degraded to protein fragments which often lead to bitter taste impressions in protein hydrolysates.

A further advantage of the process is that the fungal cell walls are digested under mild conditions by the enzyme preparation used. The cellular constituents are usually "extracted" at about 50° C., so that the aroma compounds and flavour substances pass virtually unchanged and at good intensity into the extract. This is shown by an aroma profiling and taste profiling of the mushroom flavouring (Example 4) and a Gas Chromatography (CG)/Mass Spectrometry (MS) analysis of the aroma compounds found (Example 3) compared with the starting raw material.

On account of the low release of unusual sugars (except for trehalose) found by analysis, such as occur in fungal cell walls, for example galactose and mannose, it may be assumed that although the cell wall is perforated by the enzymes, complete maceration does not occur. This type of cell digestion facilitates the later removal of the residue (reduced water absorption capacity), and the extract can be produced with high yield during workup using centrifugal separators or using press filtration (Examples 1 and 2).

The mushroom flavourings obtained according to the invention have a typical mushroom aroma, are soluble, do not contain sand or visible fat and can be spray-dried, for example, for further use as mushroom flavour. By means of the inventive process it is also possible to obtain a mushroom flavouring which is completely water-soluble, fat-free and has no enzyme activity. The resultant mushroom flavouring can also be used in aqueous form to improve the taste of other foods. It is also possible to subject the aqueous mushroom flavouring to a drying process, for example spray-drying, vacuum-drying or freeze-drying and to produce a powder or granules. Because of the absence of enzyme, the product has a good shelf life and is also particular suitable for preparations which comprise sensitive fats such as butter fat or cream powder in the formula. In addition, the liquid mushroom flavouring can be used as a reaction component to produce a spicy base flavour carrier (reaction aroma) which does not taste of mushroom.

EXAMPLES

The examples below are intended to describe the invention in more detail.

As an example for the process and the process yields obtained, table 1 shows the processing of a cep residue which was treated according to the described process with (batch 2 and 3) or without (batch 1) addition of enzyme. The yield of extract can be increased by more than 30% in this case by the addition of enzyme. At the same time, the corresponding yield of nitrogen in the extract is increased by more than 50%, as can be seen from table 2.

Example 3 (FIGS. 1 and 2) demonstrates that the flavour and aroma components typical of mushrooms are found in the extract prepared according to the described method and that the composition and the amount of these components is such that the typical mushroom character can be detected by sensory perception (Example 4).

Example 1 Process Example

The raw material used is a sand-containing residue from cep processing which contains 8 to 12% moisture, up to 7% sand and has a particle size >0.1 mm (70%). In a conventional commercial 2 liter stainless-steel cooking pot, 150 g of this mushroom residue are boiled for 5 minutes with 600 to 800 g of tap water and then cooled to 50° C. Then 1%, based on the raw material used, of each of Flavourzyme™ and SP 299 or Novoferm 96 are added. All of the enzymes are obtainable from Novo Nordisk. Hydrolysis is performed for 17 hours at 50° C. in a heatable water-filled shaking bath in which the pot is disposed. To terminate the enzymatic reaction, the batch is boiled for 10 minutes, and then the non-degraded residue is removed from the extract using a domestic sieve. To improve the yield the moist residue is further extracted twice, each time with 300 ml of water, the batch for this purpose being boiled up for 10 minutes each time and then the liquid being removed by the sieve. The extracted residue is discarded. The hydrolysis extract and the collected extract liquids are combined and clarified using a laboratory centrifuge at 10,000 rpm. The brown supernatant separated off has a Brix (Brix=weight-% extract, measured refractometrically) of about 8 to 10 and is the product of the inventive process.

Example 2

Three different cep extracts were produced in accordance with Example 1. Batch 1 was extracted without addition of enzyme, batch 2 with 1.5 g of Flavourzyme™ and 1.5 g of Novoferm 96, batch 3 with 1.5 g of Flavourzyme™ and 1.5 g of SP 299. After the extraction, the hydrolysate yields were determined. The results are summarized in Table 1 below.

TABLE 1

| Batch No. | 1 | 2 | 3 |
|---|---|---|---|
| Cep granules, lot 493 of 04.06.98, Diafood | 150 g | 150 g | 150 g |
| Water | 800 g | 800 g | 800 g |
| Flavourzyme 1000 L | — | 1.5 g | 1.5 g |
| "Chitinase" SP 299 | — | — | 1.5 g |
| Novoferm 96 | — | 1.5 g | — |
| Reaction at 50° C. for 17 hours in the shaking bath. | | | |
| Inactivation by boiling for 5 min. | | | |
| Removal of the residue via a domestic sieve | | | |
| Residue, moist | 625.5 g | 469.1 g | 486.8 g |
| The moist residue is extracted twice with 300 g of water (boiling for 5 min). | | | |

TABLE 1-continued

| Batch No. | 1 | 2 | 3 |
|---|---|---|---|
| Removal of the residue via a domestic sieve. | | | |
| Residue, moist | 616.6 g | 248.9 g | 268.3 g |
| % DM residue | 14.50% | 13.00% | 13.60% |
| Residue, dry | 89.4 g | 32.4 g | 36.5 g |
| The hydrolysate is combined with the extracts (still containing cloud) | | | |
| Hydrolysate & extracts | 632.4 g | 1007.0 g | 954.8 g |
| The cloud is centrifuged off (15 min at 10,000 rpm) | | | |
| Cloud, moist | 41.6 g | 136.1 g | 117.7 g |
| % DM cloud | 21.60% | 23.20% | 22.80% |
| Cloud, dry | 8.99 g | 31.58 g | 26.84 g |
| Clear cep flavour | 590.8 g | 870.9 g | 837.1 g |
| °Brix | 6 | 10 | 10 |
| pH | 5.32 | 5.18 | 5.18 |
| Yield | | | |
| Hydrolysate (***g DM) | 35.45 g | 87.1 g | 83.7 g |
| Hydrolysate (****%) | 24% | 58% | 56% |
| Total residue (g DM) | 98.4 g | 64 g | 63.3 g |
| Total residue (%) | 65.60% | 42.70% | 42.20% |
| Loss | 10.40% | –% | 1.80% |

DM = Dry matter
*g DM calculated from °Brix, **% based on initial weight of ceps.

The three extracts were also analysed for a number of constituents. Table 2 below summarizes the results of the analyses and the methods used therefor.

TABLE 2

| Batch No. | 1 | 2 | 3 |
|---|---|---|---|
| DM (%) (4 h at 104° C.) | 6.40 | 9.10 | 8.90 |
| Nitrogen (%) (Kjeldahl) | 0.33 | 0.49 | 0.48 |
| MSG * $H_2O$ enzymatic (%) | 0.05 | 0.10 | 0.09 |
| Free/bound amino acids (%) (AAA) | 44 | 49 | 50 |
| Glucose (%) (HPLC) | 0 | 1.1 | 1.2 |
| Trehalose (%) (HPLC) | 2.2 | 2.0 | 2.0 |
| Glucose polymers (%) (HPLC) | 0.3 | 0.5 | 0.5 |
| Total phosphates (ppm) (IC) | 755 | 1095 | 911 |

MSG = monosodium glutamate, flavour enhancer

Example 3

A cep extract was produced in accordance with Example 1 without enzyme and a cep extract was produced in accordance with Example 1 with addition of SP 299 and Flavourzyme and, after SDE (simultaneous distillation extraction using ether) of 50 g of the respective material the resultant volatile components were subjected to GC analysis. FIG. 1 shows the resultant total peak area of all aroma and flavour compounds typical of mushroom (C8 compounds). It is shown here that their content is markedly higher in the case of enzyme-supported extraction.

Figure 2:
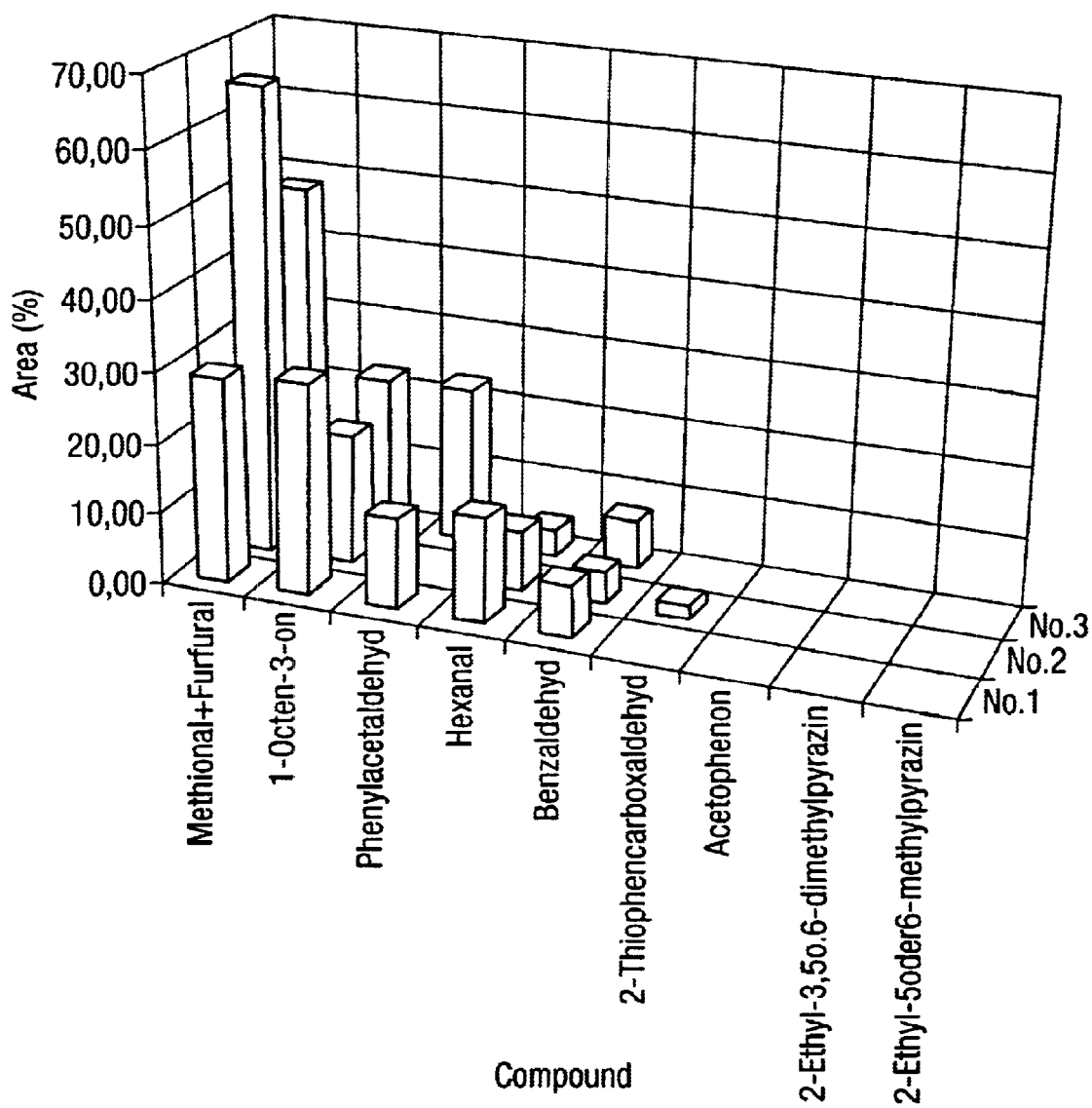
FIG. 2 shows the percentage distribution in area % of the aroma components typical of mushroom.

FIG. 2 shows the percentage distribution in area % of the aroma components typical of mushroom found by GC and identified by MS for the same mushroom extracts mentioned in FIG. 1. Although the ratios of individual values are shifted to one another as a result of the process, all impact components (10 different substances were identified) which are responsible for cep flavour are retained.

Example 4

An aroma and taste profile according to the ADL method (Arthur D. Little/USA) was prepared from an extract produced according to Example 1. In this procedure a trained test panel determine all perceptible taste and aroma attributes (with reference to comparison substances) and their intensity (0–3) in the sample is established. The results are presented as a spider web (FIG. 3).

Example 5 Process Example

The raw material used is a 1:1 mixture of the mushroom residue from Example 1 and a residue from a cep-flavour fat extraction. This residue is produced when cep granules are extracted using oil in order to produce from this the "lipophilic" flavour substances. The residue centrifuged off still contains a lot of flavour and approximately 10% of residual fat. The process is carried out as described under Example 1. The fat introduced is largely separated off during the workup.

We claim:

1. Process for the production of a natural mushroom flavouring, characterized in that a cell-wall-macerating enzyme composition exhibiting chitinase activity and/or mutanase activity is allowed to act on an edible fungus preparation and flavouring is recovered as a solution, suspension, dispersion or composition containing solids wherein a proteinase having endo/exopeptidase activity is added to the fungus preparation.

2. Process according to claim 1, characterized in that the edible fungus preparation used is a raw material without further pretreatment and after the action of the cell-wall-macerating enzyme composition, the remaining solid constituents are separated off.

3. Process according to claim 1, characterized in that the fungus preparation comprises dried mushroom.

4. Process according to claim 1, characterized in that the fungus is wild mushrooms.

5. Process according to claim 1, characterized in that the fungus is selected from the group consisting of cep, chanterelle and morels.

6. Process according to claim 1, characterized in that the edible fungus preparation used is the residue which is produced in mushroom processing.

7. Process according to claim 1, characterized in that the edible fungus preparation used is an aqueous edible fungus preparation.

8. Process according to claim 7, characterized in that the aqueous edible fungus preparation is heated prior to addition of the cell-wall-macerating enzyme composition.

9. Process according to claim 8, characterized in that the aqueous edible fungus preparation is heated to 60 to 120° C. prior to addition of the cell-wall-macerating enzyme composition.

10. Process according to claim 1, characterized in that the cell-wall-macerating enzyme composition is allowed to act on the edible fungus preparation for between 30 minutes and 48 hours.

11. Process according to claim 10, characterized in that the cell-wall-macerating enzyme composition is allowed to act on the edible fungus preparation for between 5 and 24 hours.

12. Process according to claim 1, characterized in that the cell-wall-macerating enzyme composition is allowed to act on the edible fungus preparation for at 30 to 60° C.

13. Process according to claim 12, characterized in that the cell-wall-macerating enzyme composition is allowed to act on the edible fungus preparation at 45 to 55° C.

14. Process according to claim 1, characterized in that the cell-wall-macerating enzyme composition is used at a concentration of 0.1 to 3% by weight, based on dry weight of fungus.

15. Process according to claim 14, characterized in that the cell-wall-macerating enzyme composition is used at a concentration of 0.5 to 1.5% by weight, based on dry weight of fungus.

16. Process according to claim 2, characterized in that, after removal of the solid constituents, the residue is extracted with water and the extract is combined with original extract.

17. Process according to claim 1, characterized in that the mushroom flavouring is pasteurized.

18. Process according to claim 1, characterized in that a mushroom flavouring is obtainable which is completely water-soluble, fat-free and has no enzyme activity.

19. Process according to claim 1, characterized in that the resultant mushroom flavouring is converted into dry form by vacuum-drying or spray-drying.

20. Process according to claim 1 wherein the mushroom flavouring has free amino acids.

21. Process according to claim 1 wherein the edible fungus preparation is raw material that is not subjected to pH correction before being subjected to enzyme composition.

* * * * *